Figure 1:
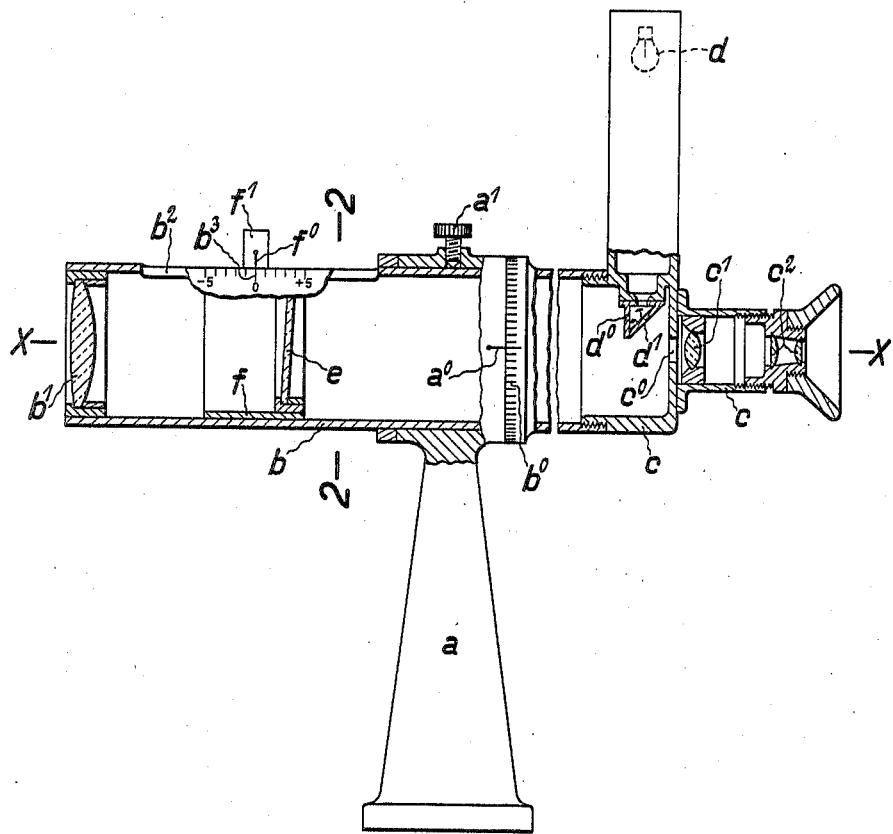

Nov. 15, 1927.

O. HENKER 1,649,114

REFRACTOMETER

Filed June 1, 1923

Inventor:
Otto Henker

Patented Nov. 15, 1927.

1,649,114

UNITED STATES PATENT OFFICE.

OTTO HENKER, OF JENA, GERMANY, ASSIGNOR TO THE FIRM OF CARL ZEISS, OF JENA, GERMANY.

REFRACTOMETER.

Application filed June 1, 1923, Serial No. 642,793, and in Germany June 3, 1922.

The present invention relates to an apparatus for the objective determination of the refractive power which that spectacle-glass which is to be located in front of an ametropic eye must have in order to image the far point of the eye at infinity, i. e. to render the eye normal-sighted. The apparatus contains in a known way an illuminating device provided with a light-opening for lighting up the background of the eye and a lens system which produces a real image of the background of the eye, whereby the light-opening outside the axis of this lens system is used. Furthermore cross wires, both arms of which intersect in the axis of the lens system, are disposed adjustably along this axis and an observing device is provided having a diaphragm (see the circular opening $c^0$ of the example shown in the drawing) which together with the light-opening are really imaged in the pupil of the eye to be examined in such a way that the two images lie side by side.

In order to be able to determine with an astigmatic eye conveniently and quickly in both principal sections the refractive power of the spectacle-glass which is to be located in front of the eye, according to the present invention the cross wires and the light-opening are simultaneously disposed rotatable about the optical axis and coupled for uniform rotation with such a relative adjustment that the plane containing the optical axis and the centre of the light-opening includes one of the two arms of the cross wires.

With a view to removing the reflections produced by the lens system imaging the background of the eye, it is advisable to fit at the place of the cross wires a stop in such a way as to cover the middle part of the cross wires. In order to create a fixing point for the eye to be examined, it is advisable to impart to the diaphragm at that place in which it is intersected by the optical axis a punctiform opening.

Figure 2:
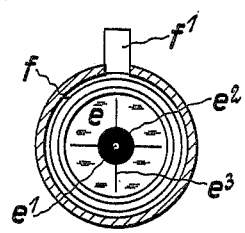

Figs. 1 and 2 of the annexed drawing show a constructional example of an apparatus according to the invention. Fig. 1 is a vertical section through the apparatus containing the optical axis, Fig. 2 is a cross section on the line 2—2 of Fig. 1.

In a standard $a$ there is supported within a collar $a$ tube $b$, carrying at its right end a casing $c$ and being rotatable as a whole together with the said casing about the axis X—X. The tube can be fixed relatively to the standard $a$ by means of a screw $a^1$, whereby the position of the tube at any one time is indicated on a scale $b^0$ placed on the rotating tube by an index $a^0$ disposed on the collar of the standard in which the tube is rotated. The tube $b$ contains at its one end a lens $b^1$ which serves for producing a real image of the background of the eye to be examined. Within the casing $c$ screwed to the tube, is disposed a microscope serving for the observation of this image and having an objective $c^1$ fitted close behind a small, circular opening $c^0$ of the casing $c$ and an ocular $c^2$ fitted in a thread-mount, the distance of which ocular from the objective can be adjusted by rotating the ocular. For lighting up the background of the eye an illuminating device is provided, of which only the source of light $d$ is shown. The light emanating from this source of light enters the tube $b$ through a punctiform opening $d^0$ after having traversed a prism $d^1$. The light-opening $d^0$ is so positioned relatively to the diaphragm aperture $c^0$ that both openings are really imaged side by side in the eye-pupil by the lens $b^1$. A small, circular mark $e^1$, a large circular mark $e^2$ concentric with it and cross wires $e^3$, both arms of which intersect at the centre of both circular marks, are so traced on a glass plate $e$ that the centre of the circular marks lies in the axis of the lens $b^1$. The surface between the two circular marks $e^1$ and $e^2$ is blackened. The glass plate $e$ is inclined to the axis of the lens $b^1$ at an angle, slightly deviating from 90°. The glass plate $e$ is disposed in a bushing $f$ supported within the tube $b$ and provided with a member $f^1$ projecting through a slit $b^2$ of the tube $b$ which slit is parallel to the axis of the tube. The bushing can be displaced by means of the member $f$ in the axial direction of the tube $b$, whereby rotations of the bushing relatively to the tube are prevented by the said member. An index $f^0$ of the member $f^1$ indicates on a diopter scale $b^3$ of the tube $b$ the position adjusted at any one time of the mark system.

In order to examine an astigmatic eye the apparatus must be adjusted relatively to the eye to be examined in such a way that the image of the opening $d^0$ lies in the eye-pupil. The patient is then required to continuously fix his eye upon the mark $e^1$, and the ocular $c^2$ is adjusted by means of rotation in such a way that the observer clearly sees the retina. Thereafter it is necessary to turn the tube $b$ into such a position that for the observer the one arm of the cross wires $e^3$ coincides with the image of it produced on the retina. This proves that the plane containing the axis of the lens $b^1$ and the centre of the opening $d^0$ coincides with one of the two principal sections of the eye. Thereupon it is necessary to displace the glass plate $e$, viz (in order to avoid a strain of accommodation of the patient) from its rear terminal position until the other arm of the cross wires coincides with the image of it produced on the retina. The index $a^0$ indicates on the scale $b^0$ the meridian of the principal section examined and the index $f^0$ indicates on the scale $b^3$ the refractive power which the correction spectacle-glass must have in this principal section. Thereupon the tube $b$ is rotated through 90° and the refractive power of the correction spectacle-glass, required for the other principal section, ascertained.

With an axially symmetrical eye a single ascertainment in an optional meridian is sufficient.

I claim:

1. In an apparatus for the purpose set forth a source of light, a collective lens system, a diaphragm located between the source of light and the lens system offset from and rotatable about the axis of this system and adapted to be imaged by the lens system in the pupil of the eye to be observed, a pair of cross wires located between the collective lens system and the diaphragm, which cross wires intersect each other in the axis of the lens system and are rotatable about and displaceable along this axis, one of both arms of the cross wires coinciding with the plane containing the said axis and the centre of the said diaphragm, an observing device adapted to receive the light rays emanating from the source of light through the said diaphragm and reflected by the retina of the eye to be observed, a second diaphragm located in front of the observing device and adapted also to be imaged by the lens system in the said pupil, and means adapted to jointly rotate the first named diaphragm and the pair of cross wires.

2. In an apparatus for the purpose set forth a source of light, a collective lens system, a diaphragm located between the source of light and the lens system offset from and rotatable about the axis of this system and adapted to be imaged by the lens system in the pupil of the eye to be observed, a pair of cross wires located between the collective lens system and the diaphragm, which cross wires intersect each other in the axis of the lens system and are rotatable about and displaceable along this axis, one of both arms of the cross wires coinciding with the plane containing the said axis and the centre of the said diaphragm, a stop connected with the cross wires and covering the middle part of the same, an observing device adapted to receive the light rays emanating from the source of light through the said diaphragm and reflected by the retina of the eye to be observed, a second diaphragm located in front of the observing device and adapted also to be imaged by the lens system in the said pupil, and means adapted to jointly rotate the first named diaphragm and the pair of cross wires.

3. In an apparatus for the purpose set forth a source of light, a collective lens system, a diaphragm located between the source of light and the lens system offset from and rotatable about the axis of this system and adapted to be imaged by the lens system in the pupil of the eye to be observed, a pair of cross wires located between the collective lens system and the diaphragm, which cross wires intersect each other in the axis of the lens system and are rotatable about and displaceable along this axis, one of both arms of the cross wires coinciding with the plane containing the said axis and the centre of the said diaphragm, a stop connected with the cross wires and covering the middle part of the same and containing a small opening, an observing device adapted to receive the light rays emanating from the source of light through the said diaphragm and reflected by the retina of the eye to be observed, a second diaphragm located in front of the observing device and adapted also to be imaged by the lens system in the said pupil, and means adapted to jointly rotate the first named diaphragm and the pair of cross wires.

OTTO HENKER.